(No Model.)
J. J. HENRY.
CAR BRAKE.
No. 325,209. Patented Aug. 25, 1885.
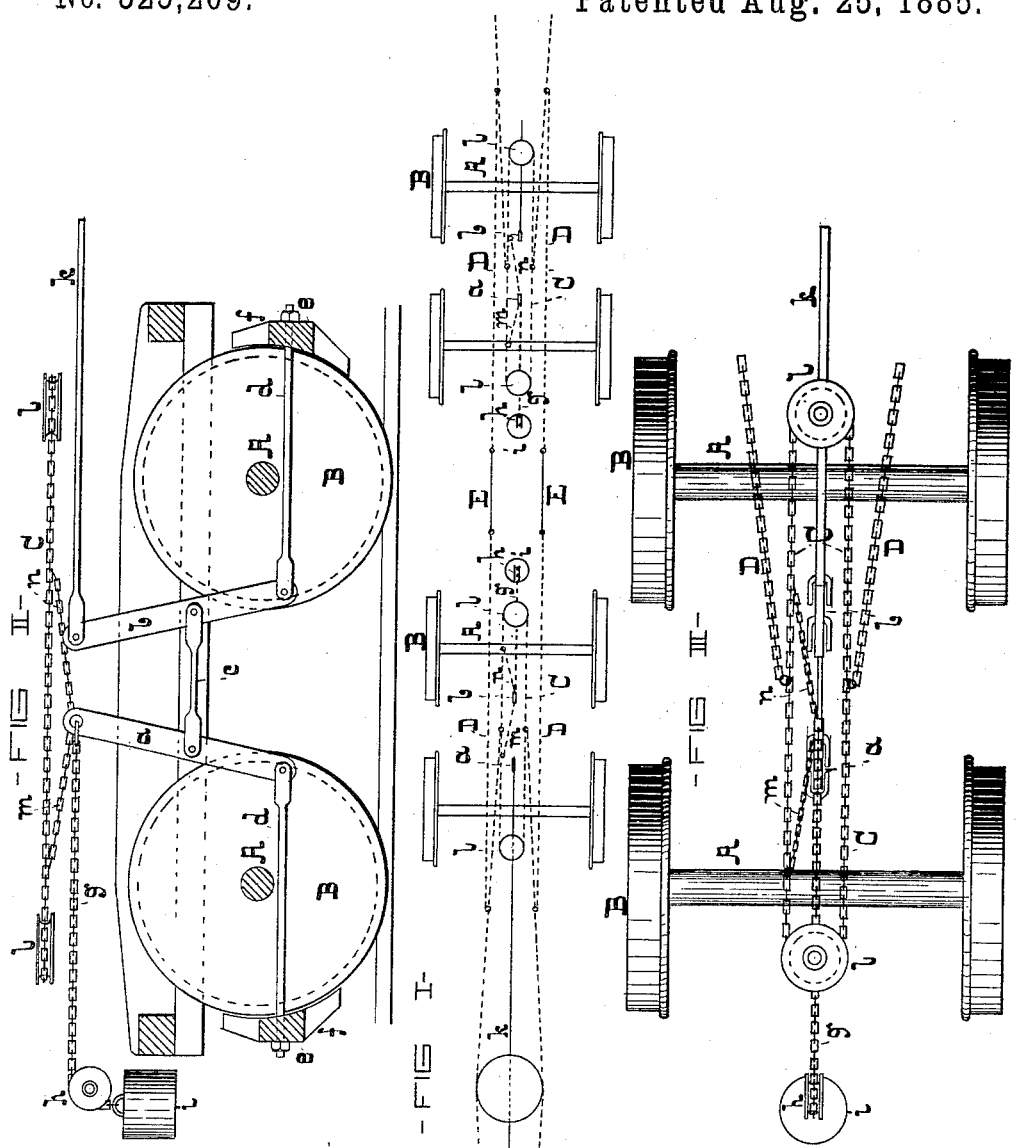
WITNESSES
Danl Fisher
Charles W. Arnold
INVENTOR
John Joseph Henry
by G. H. W. T. Howard
Atty.

United States Patent Office.

JOHN JOSEPH HENRY, OF BALTIMORE, MARYLAND, ASSIGNOR OF ONE-HALF TO GEORGE ALEXANDER SCHAAL, OF SAME PLACE.

CAR-BRAKE.

SPECIFICATION forming part of Letters Patent No. 325,209, dated August 25, 1885.

Application filed January 28, 1885. (No model.)

*To all whom it may concern:*

Be it known that I, JOHN JOSEPH HENRY, of the city of Baltimore, and State of Maryland, have invented certain Improvements in Automatic Car-Brakes, of which the following is a specification.

This invention, briefly stated, consists in combining with the ordinary brake mechanism of a car a series of weights, which are held in suspension by devices under control of the engineer, and adapted to be released to apply the brake by hand or automatically by the accidental separation of the cars, as will hereinafter fully appear.

In the further description of the said invention which follows, reference is made to the accompanying drawings, forming a part hereof, and in which—

Figure I is a plan of certain parts of the brake mechanism of two cars, showing the general plan of the invention. Figs. II and III are enlarged views of portions of the same.

A A are the axles, and B B the wheels. The ordinary brake mechanism with which my invention is combined consists in the present case of the levers $a$ and $b$, connected by the link $c$, and the rods $d$, which unite the said levers with the brake-beams $e$, carrying the shoes $f$. To the lever $a$ is attached a chain, $g$, which extends over a sheave, $h$, and is fastened to a weight, $i$. This weight, when not held in an elevated position, falls by the force of gravity and actuates the levers $a$ and $b$. The lever $b$ is attached to the brake-levers of the other truck by means of a rod, $k$, to operate them; but the latter are also provided with a weight similar to the one just described. From the above description it will be understood that the brake mechanism of both trucks are connected and operated on by both weights when the same are allowed to descend. Each truck is provided with an endless chain, C, supported by sheaves $l$, and connected to the lever $a$ by means of branch chains $m$ and $n$, and the two endless chains are united by other chains, D. Coupling chains E serve to connect the chains D of the several cars, and thereby make the brake mechanism throughout the train continuous.

The actuating devices under control of the engineer, and which are applied to the chains E, are not shown.

It is intended that the weights $i$, when released, shall be sufficient under ordinary circumstances to place the necessary strain on the brake shoes to stop the train; but should extra strain be required it is only requisite to add force to the chain by any suitable means, also under control of the engineer. The swinging of the weights is prevented by suitable guides, which need no description herein.

It will be understood that the arrangement of the chains shown herein admits of a number of modifications without departing from the spirit of the invention—for instance, a single endless chain could be used for each car, instead of one for each truck.

When the continuity of the train is preserved, the brake is applied by the engineer; but in case of any car becoming detached, the weights on the disconnected car being released from their sustaining mechanism automatically actuate the shoes and the car is stopped.

I claim as my invention—

In a car-brake, an endless chain supported on sheaves and connected to a lever forming a part of the brake mechanism, combined with a pendent weight attached to the said endless chain, and means to operate the said endless chain, substantially as and for the purpose specified.

JOHN JOSEPH HENRY.

Witnesses:
WM. T. HOWARD,
CHAS. W. ARNOLD.